United States Patent
Baccaro et al.

(10) Patent No.: US 9,429,256 B2
(45) Date of Patent: Aug. 30, 2016

(54) OXYGEN BARRIER FILM FOR PIPE

(71) Applicants: Saudi Basic Industries Corporation, Riyadh (SA); Sabic Global Technologies B.V., Bergen of Zoom (NL)

(72) Inventors: Lucio Baccaro, Maastricht (NL); Emanuel Joseph Herman Marie Van der Ven, Tilburg (NL)

(73) Assignees: SAUDI BASIC INDUSTRIES CORPORATION, Riyadh (SA); SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/899,217

(22) PCT Filed: Jun. 17, 2014

(86) PCT No.: PCT/EP2014/062623
§ 371 (c)(1),
(2) Date: Dec. 17, 2015

(87) PCT Pub. No.: WO2014/202554
PCT Pub. Date: Dec. 24, 2014

(65) Prior Publication Data
US 2016/0146378 A1 May 26, 2016

(30) Foreign Application Priority Data

Jun. 18, 2013 (EP) ..................................... 13172450

(51) Int. Cl.
*F16L 9/12* (2006.01)
*B32B 27/30* (2006.01)
(Continued)

(52) U.S. Cl.
CPC . *F16L 9/12* (2013.01); *B32B 1/08* (2013.01); *B32B 27/306* (2013.01); *B32B 27/32* (2013.01);
(Continued)

(58) Field of Classification Search
CPC ... F16L 9/12; F16L 58/181; F16L 2011/047; F16L 47/02; B32B 27/306; B32B 27/32; B32B 27/327; B32B 1/08; B32B 2250/05; B32B 2250/24; B32B 2250/246; B32B 2250/40; B32B 2270/00; B32B 2307/7244; B32B 2597/00
See application file for complete search history.

(56) References Cited

U.S. PATENT DOCUMENTS 3,753,331 A 8/1973 Sato
5,017,714 A 5/1991 Welborn, Jr.
(Continued)

FOREIGN PATENT DOCUMENTS

| EP | 1146273 A1 | 10/2001 |
| EP | 2286658 A2 | 2/2011 |
| GB | 2349928 A | 11/2000 |
| WO | 2006133968 A1 | 12/2006 |
| WO | 2008022324 A2 | 2/2008 |

OTHER PUBLICATIONS

International Search Report for International Application No. PCT/EP2014/062623; International Filing Date: Jun. 17, 2014; Date of Mailing: Sep. 3, 2014; 5 Pages.
(Continued)

*Primary Examiner* — Michael C Miggins
(74) *Attorney, Agent, or Firm* — Cantor Colburn LLP (57) ABSTRACT

The present invention relates to an assembly of pipe surrounded by a multilayer oxygen barrier film wherein the multilayer oxygen barrier film comprises, in the following order, a) a layer comprising 60-100 wt % of LLDPE (linear low density polyethylene) and 0-40 wt % of LDPE (low density polyethylene), b) a first tie layer, c) a polar oxygen barrier layer, d) a second tie layer and e) a layer comprising 60-100 wt % of LLDPE and 0-40 wt % of LDPE, preferably wherein the pipe is closer to the layer e) than to the layer a).

16 Claims, 1 Drawing Sheet

(51) Int. Cl.
*B32B 27/32* (2006.01)
*B32B 1/08* (2006.01)
*F16L 47/02* (2006.01)
*F16L 58/18* (2006.01)
*F16L 11/04* (2006.01)

(52) U.S. Cl.
CPC .............. *B32B 27/327* (2013.01); *F16L 47/02* (2013.01); *B32B 2250/05* (2013.01); *B32B 2250/24* (2013.01); *B32B 2250/246* (2013.01); *B32B 2250/40* (2013.01); *B32B 2270/00* (2013.01); *B32B 2307/7244* (2013.01); *B32B 2597/00* (2013.01); *F16L 58/181* (2013.01); *F16L 2011/047* (2013.01)

(56) References Cited

U.S. PATENT DOCUMENTS

| | | |
|---|---|---|
| 5,324,820 A | 6/1994 | Baxter |
| 6,279,614 B1 | 8/2001 | Riesselmann et al. |
| 6,730,739 B2 | 5/2004 | Gipson |
| 2015/0041465 A1 | 2/2015 | Komatsu et al. |

OTHER PUBLICATIONS

Peacock "Handbook of Polyethylene Structures, Properties, and Applications," Marcel Dekker, Inc. New York, 2000, pp. 43-66.
Written Opinion of International Searching Authority for International Application No. PCT/EP2014/062623; International Filing Date: Jun. 17, 2014; Date of Mailing: Sep. 3, 2014; 5 Pages.

OXYGEN BARRIER FILM FOR PIPE

CROSS REFERENCE TO RELATED APPLICATIONS

This application is a 371 of International Application No. PCT/EP2014/062623, filed Jun. 17, 2014, which claims priority to European Application No. 13172450.2, filed Jun. 18, 2013 which are incorporated herein by reference in their entirety.

The present invention relates to an assembly comprising a pipe surrounded by an oxygen barrier film. The present invention also relates to a process for making such assembly. The present invention further relates to a multilayer oxygen barrier film and the use of such film for providing an oxygen barrier to a pipe.

A water transport pipe with an oxygen barrier film is known. The requirements for the barrier film are relatively strict in that the barrier film must remain intact for 50 years. This is typically tested by tests in which the temperature of the film is raised back and forth from 20 to 90° C. for 5000 times according to ISO17455:2005 (Method I: dynamic test).

EP1146273 discloses a multilayered pipe for hot water circulation comprising a thermoplastic resin composition (C) layer comprising 50 to 99% by weight of an ethylene vinyl alcohol copolymer (EVOH) (A) and 1 to 50% by weight of multilayered polymer particles (B), an adhesive resin (F) layer and a thermoplastic resin (E) layer. The pipe is made by co-extrusion molding. As the examples of the thermoplastic resin (E), polyolefins such as high density, medium density or low density polyethylene are mentioned, as well as polyamide resins, polyester resins, polystyrene resins, polyvinyl chloride resins, acrylic resins, polyurethane resins, polycarbonate resins, and polyvinyl acetate resins.

The co-extrusion process is not easy to manage due to the different polymer thermal properties between the thermoplastic resin constituting the innermost layer (main component of the pipe) and EVOH. EVOH layer is also more rigid than the main component. This may cause breaking of EVOH which results in air gaps or limitations in pipe bending angle. The EVOH layer at the surface of the pipe is not smooth when made by co-extrusion. The EVOH layer can further cause production problems as EVOH can degrade during production, which requires stopping the production line to clean before resuming the production.

A further disadvantage is the difficulty encountered during the welding of the pipes. Welding of pipes provided with EVOH layer requires removal of the EVOH layer at the edges of the pipes before they can be welded. A complete removal of the EVOH layer is required for ensuring good welding. After the removal of the EVOH layer from the edges of the pipes, the edges are inserted in a joint and welded by electro induction sealing.

Removal of the EVOH layer from the edges of the pipe is typically done by scratching off the EVOH layer, which is a time consuming process. The scratching may even cause an extreme reduction of the external pipe diameter, with a negative water-tight consequence on the joint. Air gaps are formed which need to be filled by adhesives.

Furthermore the joint area does not have the oxygen barrier. Therefore, the corrosion risk on metal parts increases with the number of the joint area.

It is an object of the present invention to provide an assembly of an oxygen barrier film and a pipe accommodated therein, in which above-mentioned and/or other problems are solved.

Accordingly, the present invention provides an assembly of a pipe surrounded by a multilayer oxygen barrier film, wherein the oxygen barrier film comprises, in the following order, a) a layer comprising 60-100 wt % of LLDPE and 0-40 wt % of LDPE,
b) a first tie layer,
c) a polar oxygen barrier layer,
d) a second tie layer and
e) a layer comprising 60-100 wt % of LLDPE and 0-40 wt % of LDPE.

In a special embodiment, the pipe may be closer to the layer e) than to the layer a).

The oxygen barrier film can be placed around the pipe by wrapping the film around the pipe while stretching. The LLDPE in the layers a) and e) contributes to flexibility and stretchability of the film, which allows the film to tighten around and be fixed to the pipe. The film is wrapped around the pipe with the layer e) facing inwardly, i.e. facing the pipe and the opposite layer a) facing outwardly. The film according to the invention is typically wrapped around the pipe 1-10 times, more typically 3-5 times.

The stretching ratio is generally from 1.1 to 5, preferably from 1.3 to 3, more preferably from 1.5 to 2.

In the prior art process, a polymer pipe provided with an EVOH oxygen barrier film is made by co-extrusion of the polymer constituting the pipe, an adhesive such as grafted PP-based materials (e.g. Admer® QF 551 E: anhydride-modified polypropylene resin from Mitsui Chemicals) and EVOH. The EVOH oxygen barrier coating is firmly adhered to the PB pipe by the adhesive, which makes the coating difficult to remove and tight from the pipe. In comparison, the assembly according to the present invention does not need to comprise an adhesive between the multilayer oxygen barrier film and the pipe. Accordingly, the multilayer oxygen barrier film can be removed from the pipe just by peeling it off from the pipe or by rolling the film along the longitudinal direction.

Accordingly, two assemblies comprising pipes and oxygen barrier films according to the invention can be easily connected. The oxygen barrier films can be easily removed from the respective edge portions of the pipes. The bare edge portions can thereafter be placed in a joint and welding can be performed according to the known method.

A further advantage of the present invention may be that the polar oxygen barrier layer is well protected against humidity due to the presence of polyethylene in the multilayer film. In the present invention, the oxygen barrier layer is sandwiched by layers comprising LLDPE, which may eliminate or reduce the necessity for an additional polyethylene layer. The sandwich structure also provides the polar oxygen barrier layer a more reliable protection against water when a pipe leakage occurs and more generally, in high humidity environments (e.g. pipe layout in the ground).

A further advantage of the present invention may be that the production of the oxygen barrier film is done separately from the pipe, which allows a higher productivity and flexibility in managing the pipe stock.

The wrapping process of the multilayer film around the pipe according to the invention further allows covering only desired parts of the pipe by the multilayer film. When the pipes need to be welded, covering of only desired parts of the substrate has an advantage that the removal of the film is not necessary.

Multilayer Film

In the context of the invention with 'multilayer' film is meant that the film comprises at least five layers, for example five, six, seven, eight, nine, ten, eleven or twelve layers. Preferably, for ease of production, the amount of layers in the multi-layer film is uneven, for example the amount of layers in the multilayer film is five, seven, nine or eleven.

The surface of the film to be placed adjacent to the pipe is sometimes referred herein as an inner surface. The surface of the film distal to the pipe is sometimes referred herein as an outer surface.

In a five-layer structure film, the layer e) is present at the inner surface and the layer a) is present at the outer surface. In films with seven or more layers, layer f) (to be described) is present at the inner surface and layer g) (to be described) is present at the outer surface.

Preparation Method of the Film

The multilayer films of the present invention may be prepared by any method known in the art. Multilayer structures may be prepared for example by a blown film co-extrusion process, for example as disclosed in "Film Extrusion Manual", (TAPPI PRESS, 2005, ISBN 1-59510-075-X, Editor Butler, pages 413-435).

For example, in the process of coextrusion, the various resins may be first melted in separate extruders and then brought together in a feed block. The feed block is a series of flow channels which bring the layers together into a uniform stream. From this feed block, this multilayer material then flows through an adapter and out a film die. The blown film die may be an annular die. The die diameter may be a few centimeters to more than three meters across. The molten plastic is pulled upwards from the die by a pair of nip rolls high above the die (from for example 4 meters to more than 20 meters). Changing the speed of these nip rollers will change the gauge (wall thickness) of the film. Around the die an air-ring may be provided. The air exiting the air-ring cools the film as it travels upwards. In the centre of the die there may be an air outlet from which compressed air can be forced into the centre of the extruded circular profile, creating a bubble. This expands the extruded circular cross section by some ratio (a multiple of the die diameter). This ratio, called the "blow-up ratio" can be just a few percent to for example more than 300 percent of the original diameter. The nip rolls flatten the bubble into a double layer of film whose width (called the "layflat") is equal to ½ of the circumference of the bubble. This film may then be spooled or printed on, cut into shapes, and heat sealed into bags or other items.

Heat sealing may for example be done by sealing equipment such as a compression packaging machine as for example disclosed in U.S. Pat. No. 3,753,331.

A further suitable preparation method is casting or cast film extrusion. The preparation of a multilayer film by casting is well-known in the art. The preparation of the multilayer film according to the invention may be done as described in "Handbook of plastic films" (E. M. Abdel-Bary, iSmithers Rapra Publishing, 2003, pages 16-17).

In general, casting is a continuous operation of melting and conveying a polymer in a heated screw-and-barrel assembly. Polymer is extruded through a slit onto a chilled, highly polished turning roll, where it is quenched from one side. Film is sent to a second roller for cooling on the other side. Alternatively, polymer web is passed through a quench tank for cooling. Film then passes through a system of rollers, which have different purposes, and is finally wound onto a roll for storage.

Layers a) and e)

The layer a) contributes to giving the required flexibility and stretchability to the film. The layer a) forms the outer surface of the film in a five layer film structure. In other embodiments, one or more further layers may be provided on the layer a).

Similar to the layer a), the layer e) contributes to giving the required flexibility and stretchability to the film. The layer e) forms the inner surface of the film in a five layer film structure. In other embodiments, one or more further layers may be provided on the layer e).

Suitable materials for the layer e) are the same as the layer a). The layer a) and the layer e) may be based on the same or different materials.

Preferably, the layer a) and the layer e) are of the same material (e.g. comprise all the same components in the same amounts) and/or comprise the same LLDPE and LDPE. However, it is also possible that the layer a) and the layer e) comprise LLDPE and LDPE in different amounts and/or the layer a) and the layer e) comprise different types of LLDPE and LDPE. It is also possible that the layer a) and the layer e) comprise different types of additives in different amounts.

The layer a) and the layer e) comprise at least 60 wt % of LLDPE. The layer a) and/or the layer e) may comprise at at least 75 wt %, at least 85 wt %, least 90 wt %, at least 95 wt %, at least 98 wt % or at least 99 wt % of LLDPE. The layer a) and/or the layer e) may also consist of LLDPE.

The layer a) and/or the layer e) may comprise other components besides LLDPE. For example, the layer a) may further comprise additives, for example additives as described herein, and/or other polymers, for example other polyolefins, for example low density polyethylene and/or high density polyethylene and/or plastomers.

The layer a) and/or the layer e) may comprise LDPE in addition to LLDPE. The presence of LDPE in the layer a) is advantageous for giving desirable flow properties and bubble stability during the preparation of the film, which are advantageous especially when no layer is provided on the layer a) and the film is prepared by blown film co-extrusion process. Accordingly, the present invention provides preferred embodiments in which the film has a five layer structure wherein the film is prepared by blown film co-extrusion process and each of the layer a) and the layer e) comprises LDPE in an amount of 1-40 wt %, preferably 5-30 wt %.

When the film is prepared by casting, the layer a) and/or the layer e) preferably comprises at least 99 wt % of LLDPE and more preferably consists of LLDPE.

In the cases where a further layer is provided on the layer a), the layer a) comprises at least 99 wt % of LLDPE and more preferably consists of LLDPE. Similarly, in the cases where a further layer is provided on the layer e), the layer e) may comprise at least 99 wt % of LLDPE and more preferably consists of LLDPE. This is preferred for the improved flexibility and the stretchability of the film, both when the film is prepared by blown film co-extrusion process and by casting.

The sum of the amount of LLDPE and the amount of LDPE in the layer a) and/or the layer e) may be at least 95 wt % or at least 99 wt % of the weight of the layer a). The layer a) and/or the layer e) may consist of LLDPE and LDPE.

The layer a) and the layer e) may further comprise high density polyethylene and/or polypropylene, for instance in an amount from 0 to 5 wt %, 0 to 3 wt % or 0 to 1 wt %.

The layer e) may further comprise a tackifier. The tackifier may e.g. be an aliphatic saturated hydrocarbon based resin such as polyisobutene, an alicyclic saturated hydrocarbon based resin. In the cases where the film is not provided with a further layer on the layer e), the presence of the tackifier is advantageous for the adhesion of the layer e) to the pipe. The presence of the tackifier may also be advantageous when the film is provided with a further layer on the layer e). When it is desirable for the tackifier to be present in the layer forming the inner surface, the tackifier may be distributed in the layer e) and the layer forming the inner surface. The amount of the tackifier in the layer e) is generally from 0.5 to 15% by weight, preferably from 1 to 10%, more preferably 3 to 8% by weight on the total weight of the layer e).

In a suitable example, the layer e) may comprise 50-75 wt % of LLDPE, 10-30 wt % of LDPE and 1-10 wt % of PIB, wherein the sum of LLDPE, LDPE and PIB is 95-100 wt %. LDPE, LLDPE and HDPE and PP The production processes of LDPE, HDPE and LLDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

With linear low density polyethylene (LLDPE) as used herein is meant a low density polyethylene copolymer comprising ethylene and a C3-C10 alpha-olefin co monomer (ethylene-alpha olefin copolymer). Suitable alpha-olefin co monomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

Preferably, the linear low density polyethylene (LLDPE) has a density above 915 kg/m$^3$. A first preferred type of the LLDPE has a density of at least 915 kg/m$^3$ and less than 930 kg/m$^3$, more preferably at least 917 kg/m$^3$ and at most 920 kg/m$^3$. A second preferred type of the LLDPE has a density of at least 930 kg/m$^3$ and at most 940 kg/m$^3$, more preferably at least 932 kg/m$^3$ and at most 937 kg/m$^3$.

For purpose of the invention, the density of the linear low density polyethylene, the low density polyethylene and the high density polyethylene is determined using ISO1872-2.

Preferably, the melt flow index of the linear low density polyethylene ranges from 0.1 to 4 g/10 min, for example from 0.3 to 3 g/10 min, for example from 0.2 to 2 g/10 min, for example from 0.5 to 1.5 g/10 min. For purpose of the invention, the melt flow index is determined herein using ISO1133:2011 (190° C./2.16 kg).

The technologies suitable for the LLDPE manufacture include but are not limited to gas-phase fluidized-bed polymerization, polymerization in solution, and slurry polymerization. According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

The LLDPE in the layer a) may be a mixture of different types of LLDPE having different densities, which may have an advantage of increasing the release properties of the film. For example, the layer a) may comprise 60-80 wt % of LLDPE having a density of at least 915 kg/m$^3$ and less than 930 kg/m$^3$, more preferably at least 917 kg/m$^3$ and at most 920 kg/m$^3$, e.g. 918 kg/m$^3$, and 20-40 wt % of LLDPE having a density of 915 to 934 kg/m$^3$, more preferably at least 932 kg/m$^3$ and at most 937 kg/m$^3$, e.g. 935 kg/m$^3$.

Preferably, the density of the low density polyethylene (LDPE) ranges from 915 to 932, for example from 920 to 928 kg/m$^3$. Preferably, the melt flow index as determined using ISO1133:2011 (190° C./2.16 kg) ranges from 0.1 to 4 g/10 min, for example from 0.3 to 3 g/10 min, for example from 0.2 to 2 g/10 min, for example from 0.5 to 1.5 g/10 min.

The LDPE applied in the present film may be produced by use of autoclave high pressure technology and by tubular reactor technology.

Preferably, the density of the HDPE ranges from 940 to 965 kg/m$^3$. Preferably, the melt flow index as determined using ISO1133:2011 (190° C./2.16 kg) ranges from 0.1 to 4 g/10 min, for example from 0.3 to 3 g/10 min, for example from 0.2 to 2 g/10 min, for example from 0.5 to 1.5 g/10 min.

With polypropylene as used herein is meant propylene homopolymer or a copolymer of propylene with an α-olefin, for example an α-olefin chosen from the group of α-olefin having 2 or 4 to 10 C-atoms, for example ethylene, for example wherein the amount of α-olefin is less than 10 wt % based on the total propylene copolymer.

Polypropylene and a copolymer of propylene with an α-olefin can be made by any known polymerization technique as well as with any known polymerization catalyst system. Regarding the techniques, reference can be given to slurry, solution or gasphase polymerizations; regarding the catalyst system reference can be given to Ziegler-Natta, metallocene or single-site catalyst systems. All are, in themselves, known in the art.

Preferably, the polypropylene used in the invention is a propylene co-polymer, preferably a copolymer of propylene en ethylene.

The polypropylene has a melt temperature ($T_m$) from 140° C. to 200° C. and/or a crystallization temperature ($T_c$) from 100° C. to 140° C., wherein the $T_m$ and $T_c$ are determined using Differential Scanning calorimetry according to ASTM D 3418-08 using a scan rate of 10° C./min on a sample of 10 mg and using the second heating cycle.

Preferably, the melt mass flow rate of the polypropylene as determined using ASTM D1238-10 (230° C./2.16 kg) ranges from 0.3-100 g/10 min. Preferably, the melt mass flow rate of the polypropylene ranges from 0.5 to 25 g/10 min, more preferably from 0.5 to 10 g/10 min.

Layer b) and Layer d)

The layer a) is generally non-polar and the layer c) is generally polar. The layer b) has the function of attaching the non-polar layer a) and the polar layer c).

The term "polar layer" is well known and is herein understood to mean a layer comprising polar polymers. Polar polymers comprise atoms (for example oxygen) that have a negative electrical charge and other atoms (for example hydrogen) that have a positive electrical charge. As opposed to a polar layer, the electrical charge is distributed evenly over the atoms in a non-polar layer.

The layer b) may be of any type customary for use as a tie layer for attaching a polar layer and a non-polar layer in a multilayer film. Preferably, the layer b) comprises a functionalized polyolefin containing acid or acid anhydride functional groups, for example (meth)acrylic acid or maleic anhydride. It may for example be a polyethylene or a polypropylene onto which the (meth)acrylic acid or the maleic anhydride has been grafted. Suitable materials for use in the layer b) include Yparex OH042 as described e.g. in WO2006133968. Further suitable materials include Amplify supplied by DOW and Bynel supplied by DuPont.

In particularly preferred embodiments, the layer b) may comprise anhydride-modified LLDPE, such as maleic anhydride-modified LLDPE.

The layer b) may further comprise (unmodified) LLDPE. In suitable examples, the layer b) comprises 50-80 wt % of LLDPE and 20-50 wt % of the functionalized polyolefin as described above. The presence of LLDPE allows the use of a less amount of the functionalized polyolefin, which is advantageous from the cost point of view.

The layer d) has the function of attaching the non-polar layer e) and the polar layer c). Suitable materials for the layer d) are the same as the layer b). The layer b) and the layer d) may be based on the same or different materials.

Preferably, the layer b) and the layer d) are of the same material (e.g. comprise all the same components in the same amounts) and/or comprise the same functionalized polyolefin.

However, it is also possible that the layer b) and the layer d) comprise functionalized polyolefin in a different amount and/or the layer b) and the layer d) comprise a different functionalized polyolefin.

Layer c)

Preferably, the layer c) comprises an ethylene vinyl alcohol copolymer (EVOH). It is herein understood that EVOH is a saponified ethylene-vinyl acetate based copolymer having an ethylene content of from 20 to 60% by mol.

Preferably, the layer c) comprises at least 60 wt % of EVOH, more preferably at least 70%, for example at least 80%, for example at least 90%, for example at least 99% by weight based on the layer.

Preferably, the layer c) further comprises 1-30 wt % of a saponified ethylene-vinyl acetate based copolymer having an ethylene content of 70% by mol or more.

Preferably, the sum of EVOH and the saponified ethylene-vinyl acetate based copolymer having an ethylene content of 70% by mol or more is at least 95 wt %, preferably at least 99 wt % and preferably is 100 wt % of the total weight of layer f).

Preferably, the layer c) is or comprises the resin composition layer as disclosed in EP2286658. Preferably, the layer c) comprises a saponified ethylene-vinyl acetate based copolymer (A) having an ethylene content of from 20 to 60% by mol (i.e. EVOH) and a saponified ethylene-vinyl acetate based copolymer (B) having an ethylene content of 70% by mol or more, wherein a blending ratio (A)/(B) of the saponified ethylene-vinyl acetate based copolymer (A) to the saponified ethylene-vinyl acetate based copolymer (B) is from 99/1 to 70/30 by weight ratio. The oxygen barrier layer of this type has an advantageous flexibility combined with a good oxygen barrier property.

The saponified EVA (B) is a water-insoluble resin similar to the EVOH resin (A), but does not have the high degree of gas-barrier properties unlike the EVOH resin (A) because of its high ethylene content. Accordingly, the saponified EVA (B) is recognized by those skilled in the art as a resin completely different from the EVOH resin (A).

In addition, the saponified EVA (B) is a resin clearly different also from the ethylene-vinyl acetate copolymer (a resin generally called EVA resin which has flexibility) in view of the presence or absence of hydroxyl group. Since the saponified EVA (B) has hydroxyl groups, it has a higher polarity than the EVA resin, but on the other hand, it has a property of being poor in flexibility, so that it is recognized by those skilled in the art that the EVA resin and the saponified EVA (B) are completely different.

Layer f)

The film may further comprise a cling layer f) provided at the surface of the film adjacent to the pipe, i.e. the inner surface of the film. In other words, a cling layer f) may be present on top of layer a). The film is applied to the pipe with the layer f) contacting the pipe. The layer f) improves the adhesion of the film to the pipe and between the films.

When the multilayer film is prepared by blown film co-extrusion process, the layer f) preferably comprises LLDPE and ethylene vinyl acetate (EVA) and/or polyisobutylene (PIB). In preferred embodiments, the layer f) comprises 30-50 wt % of LLDPE, 40-60 wt % of EVA and 5-15 wt % of PIB. The sum of LLDPE, EVA and PIB is preferably at least 95 wt %, preferably at least 99 wt % and preferably is 100 wt % of the total weight of layer f).

EVA

EVA is the copolymer of an ethylene and vinyl ester $C_{2-6}$ aliphatic carboxylic acid consisting of 3% to 90% of vinyl ester and the rest being ethylene. Preferably, the vinyl ester is vinyl acetate (VA). The weight percent of vinyl acetate is preferably from 10 to 40%, with the remainder being ethylene. More preferably, the weight percent of vinyl acetate is preferably from 12 to 29%, with the remainder being ethylene. Suitable EVA is commercially available e.g. from Dow, ExxonMobil, Versalis and Arkema.

PIB

Polyisobutylene (PIB) is a polymer of isobutylene. Suitable polyisobutylene is described e.g. in U.S. Pat. No. 6,730,739: a homopolymer of isobutylene wherein the double bonds are mainly in the alpha position. Suitable examples include PW60 by Polytechs.

When the multilayer film is prepared by casting, the layer f) preferably comprises LLDPE and a plastomer. In preferred embodiments, the layer f) comprises 70-99 wt % of LLDPE and 1-30 wt % of the plastomer. The sum of LLDPE and the plastomer is preferably at least 95 wt %, preferably at least 99 wt % and preferably is 100 wt % of the total weight of layer f).

Plastomer

Within the framework of the invention with plastomer is meant a copolymer of ethylene and alpha-olefin comonomer having 4 to 8 carbon atoms, wherein the alpha-olefin comonomer is present in an amount from about 2.5 mole % to about 13 mole % and wherein the ethylene is present in an amount from about 97.5 mole % to about 87 mole % of the plastomer that provides for a density of 0.915 g/cc or less and is limited in an amount so as not to reduce the density to a value less than 0.865 g/cc.

The alpha-olefin comonomer in the plastomer is preferably an acyclic monoolefin such as 1-butene, 1-pentene, 1-hexene, 1-octene, or 4-methylpentene-1, most preferably 1-butene 1-hexene or 1-octene.

The comonomer of the plastomer is preferably an acyclic monoolefin such as butene-1, pentene-1, hexene-1, octene-1, or 4-methylpentene-1.

Plastomers which are suitable for use in the current invention are commercially available for example under the trademark EXACT™ available from ExxonMobil Chemical Company of Houston, Tex. or under the trademark ENGAGE™ polymers, a line of metallocene catalyzed plastomers available from Dow Chemical Company of Midland, Mich.

Plastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. Plastomers may also be prepared using traditional types of heterogeneous multi-sited Ziegler-Natta catalysts.

Preferably, the LLDPE and the plastomer in the layer f) are mixed. The manner in which the plastomer is mixed with the linear low density polyethylene is not critical, preferably, the plastomer is well dispersed throughout the linear low density polyethylene, for example by using melt-mixing as described herein.

Layer g)

The film may further comprise a release layer g) provided at the surface of the film opposite of the layer f), i.e. the outer surface of the film.

The presence of the layer g) is advantageous in the film according to the invention comprising layer f). When the film is wound e.g. during manufacturing or storage, the cling layer f) may cause multiple films to stick to each other. The release layer g) present at the outer surface of the film prevents sticking of the films.

In the cases where the layer f) comprises EVA and/or PIB, the layer g) preferably comprises LLDPE and LDPE. Preferably, the layer g) comprises 60-85 wt % of LLDPE and 40-15 wt % of LDPE. The sum of LLDPE and LDPE is preferably at least 95 wt %, preferably at least 99 wt % and preferably is 100 wt % of the total weight of layer g).

In the cases where the layer f) comprises a plastomer, the layer g) preferably comprises a mixture of different types of LLDPE having different densities. For example, the layer g) comprises a first type of LLDPE having a density of at least 915 kg/m$^3$ and less than 930 kg/m$^3$, e.g. 918 kg/m3 and a second type of LLDPE having a density of at least 930 kg/m$^3$ and at most 940 kg/m$^3$, e.g. 935 kg/m3. Preferably, the layer g) comprises 60-80 wt % of the first type of LLDPE and 20-40 wt % of the second type of LLDPE. The amount of LLDPE in the layer g) is preferably at least 95 wt %, preferably at least 99 wt % and preferably is 100 wt % of the total weight of layer g).

Further Layers

The film may further comprise one or more layers between the layer e) and the layer f). Alternatively or additionally, the film may further comprise one or more layers between the layer a) and the layer g). The presence of the further layers between the layer e) and the layer f) and between the layer a) and the layer g) may be advantageous in that the amount of any additives such as UV stabilizer in one layer may be reduced, since the additives may be added in different layers.

Each of these further layers preferably comprises LLDPE. Each of these further layers may further comprise various components described for the layers a) and e), such as LDPE, HDPE, PP. The layer(s) between the layer e) and the layer f) may have the same components as the layer e). The layer(s) between the layer a) and the layer g) may have the same components as the layer a).

Each of these further layers preferably comprises at least 99 wt % of LLDPE and more preferably consists of LLDPE.

Thickness

The film may have a thickness of e.g. 10 to 100 μm, for example from 20 to 50 μm. The film preferably has a thickness of 20 to 25 μm. The thickness of the layer c) is preferably 1 to 10 μm. The thickness of the other layers if the multilayer film of the present invention is in principle not critical and may for example be 5 to 20 μm. Not all layers in the multi-layer film of the invention need to have the same thickness. For example, one or more layers in the multi-layer film may be thicker than the other layers to increase the stability of the production process.

Stretchability of the film increases over time (when the film absorbs moisture), but at the same time the mechanical and barrier properties for oxygen decrease. When the thickness of layer c) is at most 4 μm, the stretchability of the film is high even without the moisture absorption. Accordingly, the thickness of the layer c) is preferably 1 to 4 μm. This allows the immediate use of the film with a good stretchability.

The thickness of layer c) influences the number of wraps around the pipe required for obtaining sufficient barrier properties. A layer c) having a thickness of 1 μm requires e.g. around 50 wraps around the pipe for obtaining sufficient barrier properties for small diameter pipes. The number of wraps is preferably lower than 15, more preferably lower than 10, more preferably 3-5 in view of ease of processing. A layer c) having a thickness of at least 2 μm is suitable in view of ease of processing, requiring a relatively small number of wraps.

The outer diameter of the pipe used in the present invention varies, but in some of the important embodiments, the pipe has an outer diameter of 10-100 mm, for example 10-35 mm, 35-50 mm or 50-100 mm.

As described above, the number of wraps around the pipe required for obtaining sufficient barrier properties is higher when the thickness of layer c) is lower. This difference in the required number of wraps in relation to the thickness of layer c) is also dependent on the diameter of the pipe and is especially large for pipes with smaller diameter, e.g. 10-35 mm.

For obtaining a film which may be used immediately with a proper stretchability and an acceptable number of wraps, the layer c) preferably has a thickness of 2-4 μm. This is especially advantageous when the pipe has an outer diameter of less than 35 mm, especially 10-25 mm or 15-25 mm.

Additives

Each layer may also contain appropriate amounts of other additives such as for example fillers, antioxidants, pigments, (UV-)stabilizers, antistatic agents and polymers depending on the specific use of the multi-layer film. Typically, additives may be present in a layer in an amount of 10 to 10000 ppm, for example in an amount of 100 to 5000 ppm based on the layer. Therefore, the invention also relates to a multi-layer film wherein one or more layers further comprise(s) one or more additives.

For example, each layer in the multilayer film of the invention may comprise an amount of additives of 0 to 5 wt %, for example 0 to 2 wt % based on the total weight of the layer and 0 to 100 wt % of the polymer(s), wherein the sum of the polymer(s) and the additives is 100 wt % based on the total weight of the layer. For example, the polymer may be LLDPE, LDPE, plastomer, PIB and EVA.

Particularly preferred examples of the film used in the present invention include:

A multilayer oxygen barrier film of five layers prepared by blown film co-extrusion process comprising, in the following order,
a) a layer comprising 85-99 wt % of LLDPE and 1-15 wt % of LDPE,
b) a first tie layer,
c) a polar oxygen barrier layer,
d) a second tie layer,
e) a layer comprising 85-99 wt % of LLDPE and 1-15 wt % of LDPE.

A multilayer oxygen barrier film of five layers prepared by casting comprising, in the following order,
a) a layer consisting of LLDPE,
b) a first tie layer,
c) a polar oxygen barrier layer,
d) a second tie layer,
e) a layer consisting of LLDPE.

A multilayer oxygen barrier film of seven layers prepared by blown film co-extrusion process comprising, in the following order,
g) a release layer comprising 60-85 wt % of LLDPE and 15-40 wt % of LDPE,
a) a layer consisting of LLDPE,
b) a first tie layer,
c) a polar oxygen barrier layer,
d) a second tie layer,
e) a layer consisting of LLDPE,
f) a cling layer comprising 30-50 wt % of LLDPE, 40-60 wt % of EVA and 5-15 wt % of PIB, wherein the sum of LLDPE, EVA and PIB is 95-100 wt %.

A multilayer oxygen barrier film of seven layers prepared by blown film co-extrusion process comprising, in the following order,
g) a release layer comprising 60-85 wt % of LLDPE and 15-40 wt % of LDPE,
a) a layer consisting of LLDPE,
b) a first tie layer,
c) a polar oxygen barrier layer,
d) a second tie layer,
e) a layer comprising 50-75 wt % of LLDPE, 10-30 wt % of LDPE and 1-10 wt % of PIB, wherein the sum of LLDPE, LDPE and PIB is 95-100 wt %,
f) a cling layer comprising 30-50 wt % of LLDPE, 40-60 wt % of EVA and 5-15 wt % of PIB, wherein the sum of LLDPE, EVA and PIB is 95-100 wt %.

A multilayer oxygen barrier film of seven layers prepared by casting comprising, in the following order,
g) a release layer consisting of a mixture of LLDPE comprising 60-80 wt % of a first type of LLDPE having a density of at least 915 kg/m$^3$ and less than 930 kg/m$^3$ and 20-40 wt % of a second type of LLDPE having a density of at least 930 kg/m$^3$ and at most 940 kg/m$^3$
a) a layer consisting of LLDPE,
b) a first tie layer,
c) a polar oxygen barrier layer,
d) a second tie layer,
e) a layer consisting of LLDPE,
f) a cling layer comprising 90-99 wt % of LLDPE and 1-10 wt % of the plastomer.

Pipe

The pipe on which the multilayer film is to be provided is preferably made of a polymer selected from the group consisting of polybutylene (PB), crosslinked polyethylene (PEX), Polyethylene of Raised Temperature resistance (PERT) and polypropylene (PP). The pipe is most preferably made of polybutylene. These polymers for use in pipes, especially pipes for a heating system, are well known in the art, for example in Plastic Piping Handbook by: David A. Willoughby, The McGraw-Hill Companies, Inc, ISBN: 9780071359566.

In another aspect, the invention relates to a process for making the assembly according to the invention, comprising the steps of:
providing the pipe and
wrapping the film around the pipe while stretching the film to form the assembly.

In another aspect, the invention relates to a process for making a heating system comprising welded pipes, comprising the steps of:
providing two assemblies according to the invention,
partly removing the film from each of the assemblies to provide a bare edge portion to each of the assemblies and
welding the bare edge portions of the two assemblies.

It will be appreciated that the process may involve providing more than two assemblies according to the invention. The film may be removed from one assembly to provide bare edge portions at both ends of the pipe and the both edge portions may be welded to another pipe.

Preferably, the process further comprises the step of wrapping the film around the welded portion of the assemblies. This has an advantage that the welded portion of the assemblies is also provided with an oxygen barrier.

In another aspect, the invention relates to the use of the film as an oxygen barrier film for a pipe, preferably a pipe for a heating system.

In another aspect, the invention relates to the film as described above.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

Example 1

Several 7-layer films were produced on a 7-layer coextrusion blown film line, equipped with Ø 90/70/50/45/50/70/90 mm extruders with 30 L/D barrier screws to provide the layers of the film structure. Thickness of the films was 28 µm. The line was equipped with a Ø 400 mm die with IBC, a die gap of 2 mm, reversing haul-off, chilled cooling air, thickness profile measurement and back to back winder. The overall throughput of 280 kg/h and blow up ratio (BUR) of 3.5 were kept constant. Barrel temperature profiles were ramped from 40° C. at the feed section up to 200° C. at the die.

The materials used and their melt flow index as determined using ISO1133:2011 (2.16 kg/10 min/190° C.) and their density are indicated in Table 1 below.

TABLE 1

| | Composition | thickness (μm) |
|---|---|---|
| (g) | 80 wt % of LLDPE having a density of 918 kg/m$^3$ and 20 wt % of LDPE having a density of 921 kg/m$^3$ | 4 |
| (a) | 100 wt % of LLDPE having a density of 918 kg/m$^3$ | 6 |
| (b) | 100 wt % of anhydride-modified LLDPE (PX3227 by LyondellBasell) | 3 |
| (c) | SoarnoL ™ SG611B commercially available from The Nippon Synthetic Chemical Industry (a saponified ethylene-vinyl acetate based copolymer (A) having an ethylene content of from 20 to 60% by mol (i.e. EVOH) and a saponified ethylene-vinyl acetate based copolymer (B) having an ethylene content of 70% by mol or more, wherein the blending ratio (A)/(B) is from 99/1 to 70/30 by weight ratio) | 2 |
| (d) | 100 wt % of anhydride-modified LLDPE (PX3227 by LyondellBasell) | 3 |
| (e) | 73 wt % of LLDPE having a density of 918 kg/m$^3$, 20 wt % of LDPE having a density of 921 kg/m3 and 7 wt % of PIB (PW60 by Polytechs) | 6 |
| (f) | 46 wt % of LLDPE having a density of 918 kg/m$^3$, 40 wt % of EVA (with 14% VA content) and 14 wt % PIB (PW60 by Polytechs) | 4 |

The film was wrapped 5 times around a few meters long PB pipe having an outer diameter of 50 mm (wall of 4.6 mm) while stretching and overlapping it for about 50% of the surface. A tube was formed by the film wrapped (spiral) around the pipe to realize an assembly of a pipe surrounded by a multilayer oxygen barrier film.

The flexibility and elasticity of the film was checked by bending the assembly over an angle of 90° several times. No failure or visual creeps were seen on the film; the film was still tightly attached to the PB pipe.

Furthermore the assembly was tested by inserting it in a water circuit equipment comprising a heat exchange radiator, a boiler and a circulation pump. Ten thermo-dynamic cycling were performed by keeping water circulating and varying its temperature between 20° C. and 90° C. No loosening of the film from the pipe was seen; during the experiment the film followed the thermal deformation of the pipe.

Additional two film and PB pipe assemblies were provided. 5 cm of the film was removed from the edge of the pipe in respective assemblies. The removal of the film was easily done by rolling up the film along its longitudinal direction. The edge portions of the assemblies were placed in a joint and were welded by electro induction sealing.

The total time for making a welded construction from the two assemblies was only 15 minutes, whereas using the traditional assemblies made by co-extrusion typically takes 45 minutes. The difference is due to the time required for the removal of the oxygen barrier film from the edges of the pipes.

Example 2

Example 2 was performed using a 5-layers film prepared by cast technology. The EVOH layer thickness was increased up to 7 μm in order to check again film flexibility and elasticity (room temperature PB pipe bending and thermal-dynamic cycles).

5-layers cast films were produced. The total thickness of the films was 35 μm. All 5-layer cast films were produced on a die equipped with Ø 70/50/45/50/70 mm extruders with 30 L/D barrier screws to provide the layers of the film structure. The line was equipped with a Ø 1500 mm wide die, a die gap of 0.8 mm, first chill-roll of Ø 800 mm with cooling water temperature set at 25° C., second chill-roll of Ø 400 mm with cooling water temperature set at 20° C., thickness profile measurement and contact winder. The overall throughput of 300 kg/h was kept constant. Barrel temperature profiles were ramped from 50° C. at the feed section to 220° C. at the die.

TABLE 2

| Layer | Composition | thickness (μm) |
|---|---|---|
| (a) | 100 wt % of LLDPE having a density of 918 kg/m$^3$ | 10 |
| (b) | 100 wt % of anhydride-modified LLDPE (PX3227 by LyondellBasell) | 4 |
| (c) | SoarnoL ™ SG611B commercially available from The Nippon Synthetic Chemical Industry (a saponified ethylene-vinyl acetate based copolymer (A) having an ethylene content of from 20 to 60% by mol (i.e. EVOH) and a saponified ethylene-vinyl acetate based copolymer (B) having an ethylene content of 70% by mol or more, wherein the blending ratio (A)/(B) is from 99/1 to 70/30 by weight ratio) | 7 |
| (d) | 100 wt % of anhydride-modified LLDPE (PX3227 by LyondellBasell) | 4 |
| (e) | 100 wt % of LLDPE having a density of 918 kg/m$^3$ | 10 |

Similar to example 1, the total time for making a welded construction was significantly reduced.

Example 3

5-layers film is prepared by cast technology. The total thickness of the films is 23 μm. The cast film is produced on a die equipped with Ø 70/50/45/50/70 mm extruders with 30 L/D barrier screws to provide the layers of the film structure shown in Table 3. The line is equipped with a Ø 1500 mm wide die, a die gap of 0.8 mm, first chill-roll of Ø 800 mm with cooling water temperature set at 25° C., second chill-roll of Ø 400 mm with cooling water temperature set at 20° C., thickness profile measurement and contact winder. The overall throughput of 300 kg/h is kept constant. Barrel temperature profiles are ramped from 50° C. at the feed section to 220° C. at the die.

TABLE 3

| Layer | Composition | thickness (μm) |
|---|---|---|
| (a) | 100 wt % of LLDPE having a density of 918 kg/m$^3$ | 7 |
| (b) | 100 wt % of anhydride-modified LLDPE (PX3227 by LyondellBasell) | 3 |
| (c) | SoarnoL ™ SG611B commercially available from The Nippon Synthetic Chemical Industry (a saponified ethylene-vinyl acetate based copolymer (A) having an ethylene content of from 20 to 60% by mol (i.e. EVOH) and a saponified ethylene-vinyl acetate based copolymer (B) having an ethylene content of 70% by mol or more, wherein the blending ratio (A)/(B) is from 99/1 to 70/30 by weight ratio) | 3 |
| (d) | 100 wt % of anhydride-modified LLDPE (PX3227 by LyondellBasell) | 3 |
| (e) | 100 wt % of LLDPE having a density of 918 kg/m$^3$ | 7 |

The film has a good stretchability. The film is wrapped 12 times around a few meters long PB pipe having an outer diameter of 16 mm (wall thickness of 2.2 mm) while stretching and overlapping it for about 50% of the surface.

A tube is formed by the film wrapped (spiral) around the pipe to realize an assembly of a pipe surrounded by a multilayer oxygen barrier film. The wrapping of 12 times provides a sufficient oxygen barrier property as determined according ISO 17455:2005.

Relationship Between the Thickness of Layer (c) and the Number of Required Wraps It is desirable for an oxygen barrier film around a pipe comprising water of 80° C. to obtain oxygen permeability of not more than 1.8 mg/m$^2$·24 h·bar as determined according ISO 17455:2005. Taking a pipe having a nominal outer diameter of 16 mm (wall thickness of 2.2 mm) comprising water of 80° C., the number of wraps around the pipe necessary for obtaining such oxygen permeability is calculated for four films having layer thicknesses in Table 4.

Figure 1:
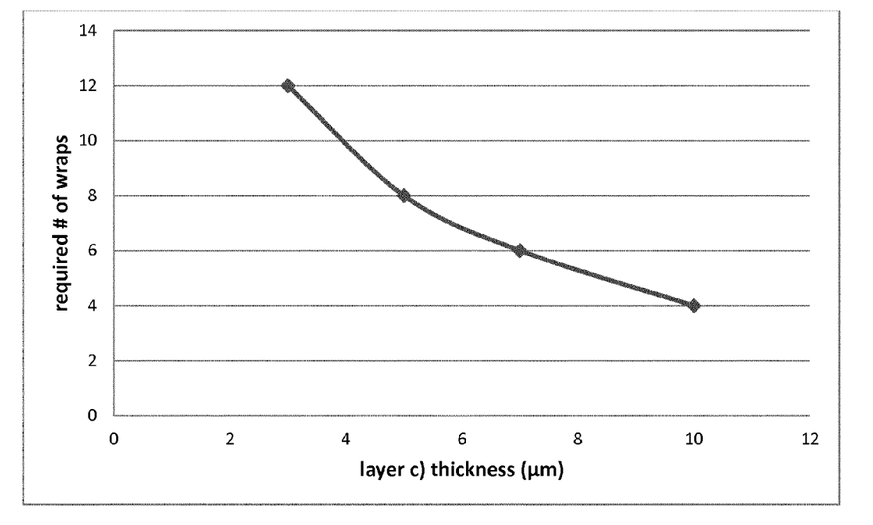
FIG. 1 is a graphical representation of the required number of wraps versus the layer c) thickness.

The compositions of each of the layers are the same as for Example 3. The numbers of required wraps as calculated are shown in Table 4. The relationship between the thickness of layer c) and the number of required wraps is also shown in FIG. 1. From table 4, it can be seen that the number of wraps around the pipe required for obtaining sufficient barrier properties is higher when the thickness of layer c) is lower.

TABLE 4

| layer | thickness (μm) | | | |
|---|---|---|---|---|
| a) | 7 | 7 | 7 | 7 |
| b) | 3 | 3 | 3 | 3 |
| c) | 3 | 5 | 7 | 10 |
| d) | 3 | 3 | 3 | 3 |
| e) | 7 | 7 | 7 | 7 |
| total | 23 | 25 | 27 | 30 |
| # of wraps | 12 | 8 | 6 | 4 |

The same calculation was done for pipes with different diameters as shown in Table 5. The calculated required numbers of wraps around the pipe are shown in Table 5 for pipes with various diameters.

TABLE 5

| | | thickness of layer c) | | | |
|---|---|---|---|---|---|
| d | t | 3 | 5 | 7 | 10 |
| 16 | 2.2 | 12 | 8 | 6 | 4 |
| 20 | 2.8 | 10 | 6 | 4 | 3 |
| 25 | 2.3 | 9 | 6 | 4 | 3 |
| 32 | 3 | 7 | 5 | 3 | 3 |
| 40 | 3.7 | 6 | 4 | 3 | 3 |
| 50 | 4.6 | 5 | 4 | 3 | 3 |
| 63 | 5.8 | 4 | 4 | 3 | 3 |
| 75 | 6.8 | 4 | 3 | 3 | 3 |
| 90 | 8.2 | 4 | 3 | 3 | 3 | d indicates nominal outer diameter of the pipe
t indicates nominal thickness of the pipe The number of wraps around the pipe required for obtaining sufficient barrier properties is higher when the thickness of layer c) is lower. The number of wraps around the pipe required for obtaining sufficient barrier properties is higher for pipes with smaller diameters. The difference in the required number of wraps in relation to the thickness of layer c) is larger for pipes with smaller diameters.

The invention claimed is:

1. An assembly of pipe surrounded by a multilayer oxygen barrier film wherein the multilayer oxygen barrier film comprises, in the following order, a) a layer comprising 60-100 wt % of LLDPE (linear low density polyethylene) and 0-40 wt % of LDPE (low density polyethylene),
b) a first tie layer,
c) a polar oxygen barrier layer,
d) a second tie layer and
e) a layer comprising 60-100 wt % of LLDPE and 0-40 wt % of LDPE.

2. The assembly according to claim 1, wherein the layer c) comprises EVOH (ethylene vinyl alcohol copolymer).

3. The assembly according to claim 1, wherein the layer b) and/or the layer d) comprises a functionalized polyolefin containing acid or acid anhydride functional groups.

4. The assembly according to claim 1, wherein layer c) has a thickness from 2 to 4 μm.

5. The assembly according to claim 1, wherein the pipe is made of a polymer selected from the group consisting of polybutylene (PB), crosslinked polyethylene (PEX), Polyethylene of Raised Temperature resistance (PERT) and polypropylene (PP).

6. A process for making the assembly according to claim 1, comprising:
providing the pipe and
wrapping the film around the pipe while stretching the film to form the assembly.

7. The process according to claim 1, wherein the pipe is closer to the layer e) than to the layer a).

8. The assembly according to claim 1, wherein the film has a five layer structure.

9. The assembly according to claim 8, wherein the film is prepared by a blown film co-extrusion process and wherein each of the layer a) and the layer e) comprises LDPE in an amount of 1-15 wt %.

10. The assembly according to claim 8, wherein the film is prepared by casting and wherein each of the layer a) and the layer e) comprises at least 99 wt % of LLDPE.

11. The assembly according to claim 1, wherein the film further comprises f) a cling layer provided at the surface of the film adjacent to the pipe and g) a release layer provided at the surface of the film opposite of the layer f).

12. The assembly according to claim 11, wherein the film is prepared by blown film co-extrusion process and wherein
the layer f) comprises LLDPE and EVA (ethylene vinyl acetate) and/or PIB (polyisobutylene) and
the layer g) comprises 60-85 wt % of LLDPE and 40-15 wt % of LDPE.

13. The assembly according claim 11, wherein the film is prepared by casting and wherein
the layer f) comprises LLDPE and a plastomer and
the layer g) comprises a first type of LLDPE having a density of at least 915 kg/m$^3$ and less than 930 kg/m$^3$ and a second type of LLDPE having a density of at least 930 kg/m$^3$ and at most 940 kg/m$^3$.

14. A process for making a heating system comprising welded pipes, comprising:
providing two assemblies according claim 1,
partly removing the film from each of the assemblies to provide a bare edge portion to each of the assemblies and
welding the bare edge portions of the two assemblies.

15. The process according to claim 14, comprising the step of wrapping the film around the welded portion of the assemblies.

16. An assembly of pipe surrounded by a multilayer oxygen barrier film wherein the multilayer oxygen barrier film comprises, in the following order, a) a layer comprising 60-100 wt % of LLDPE (linear low density polyethylene) and 0-40 wt % of LDPE (low density polyethylene),
b) a first tie layer,
c) a polar oxygen barrier layer, wherein layer c) has a thickness from 2 to 4 μm;
d) a second tie layer and
e) a layer comprising 60-100 wt % of LLDPE and 0-40 wt % of LDPE preferably wherein the pipe is closer to the layer e) than to the layer a);
wherein the amount of the EVOH in the layer c) is at least 60 wt %;
wherein each of the layer a) and the layer e) comprises LDPE in an amount of 5-15 wt %;
wherein the pipe is made of a polymer selected from the group consisting of polybutylene (PB), crosslinked polyethylene (PEX), Polyethylene of Raised Temperature resistance (PERT) and polypropylene (PP); and
wherein the film has a total layer thickness of 20 to 25 μm.

* * * * *